(12) United States Patent
Matsuda et al.

(10) Patent No.: US 12,508,801 B2
(45) Date of Patent: Dec. 30, 2025

(54) COLORED RESIN SHEET AND LEATHER-LIKE SHEET

(71) Applicant: KURARAY CO., LTD., Kurashiki (JP)

(72) Inventors: Daisuke Matsuda, Okayama (JP); Masato Warita, Okayama (JP); Takehiro Sato, Okayama (JP); Yuta Akagi, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 317 days.

(21) Appl. No.: 17/907,687

(22) PCT Filed: Apr. 1, 2021

(86) PCT No.: PCT/JP2021/014123
§ 371 (c)(1),
(2) Date: Sep. 29, 2022

(87) PCT Pub. No.: WO2021/201204
PCT Pub. Date: Oct. 7, 2021

(65) Prior Publication Data
US 2023/0147237 A1 May 11, 2023

(30) Foreign Application Priority Data
Apr. 2, 2020 (JP) .................................. 2020066451

(51) Int. Cl.
*B32B 27/20* (2006.01)
*B32B 27/12* (2006.01)
(Continued)

(52) U.S. Cl.
CPC .............. *B32B 27/20* (2013.01); *B32B 27/12* (2013.01); *C08J 5/18* (2013.01); *D06N 3/0065* (2013.01);
(Continued)

(58) Field of Classification Search
CPC . B32B 27/20; B32B 27/12; C08J 5/18; D06N 3/0065; D06N 3/042; D06N 3/123; D06N 3/14; D06N 3/186
See application file for complete search history.

(56) References Cited

U.S. PATENT DOCUMENTS 11,873,606 B2 * 1/2024 Hattori ................. D06N 3/0011
2007/0087199 A1 4/2007 Yoshimura et al.

FOREIGN PATENT DOCUMENTS

JP H07-42084 2/1995
JP 2005154971 A * 6/2005
(Continued)

OTHER PUBLICATIONS

English translation of JP 2005-154971 to Endo et al. obtained from Espacenet database. (Year: 2005).*
(Continued)

*Primary Examiner* — Jeremy R Pierce
(74) *Attorney, Agent, or Firm* — Grüneberg and Myers PLLC (57) ABSTRACT

A colored resin sheet includes a resin and a colorant dispersed in the resin, and has an average value of visible light transmittances for a red range of a wavelength of 680 to 780 nm, of 50% or more. The colored resin sheet has a combination of a lightness L* value and an average value of light transmittances for an entire visible light range of a wavelength of 380 to 780 nm, respectively, of: a) 15 or less, and 15% or more; b) greater than 15 and less than or equal to 35, and 25% or more; or c) greater than 35 and less than or equal to 60, and 40% or more. A leather-like sheet includes a colored resin layer and a surface having a lightness L* value of 40 or less, and has an average value of visible light transmittances for the red range, of 5% or more.

9 Claims, 2 Drawing Sheets (51) Int. Cl.

| | |
|---|---|
| *C08J 5/18* | (2006.01) |
| *D06N 3/00* | (2006.01) |
| *D06N 3/04* | (2006.01) |
| *D06N 3/12* | (2006.01) |
| *D06N 3/14* | (2006.01) |
| *D06N 3/18* | (2006.01) |
| *B32B 5/02* | (2006.01) |
| *B32B 7/12* | (2006.01) |
| *B32B 27/36* | (2006.01) |
| *B32B 27/40* | (2006.01) |

(52) U.S. Cl.
 CPC ............ *D06N 3/042* (2013.01); *D06N 3/123* (2013.01); *D06N 3/14* (2013.01); *D06N 3/186* (2013.01); *B32B 5/022* (2013.01); *B32B 5/026* (2013.01); *B32B 7/12* (2013.01); *B32B 27/365* (2013.01); *B32B 27/40* (2013.01); *B32B 2255/02* (2013.01); *B32B 2255/26* (2013.01); *B32B 2260/021* (2013.01); *B32B 2260/046* (2013.01); *B32B 2262/0284* (2013.01); *B32B 2264/302* (2020.08); *B32B 2305/026* (2013.01); *B32B 2305/30* (2013.01); *B32B 2307/414* (2013.01); *C08J 2375/04* (2013.01)

(56) References Cited

FOREIGN PATENT DOCUMENTS

| | | |
|---|---|---|
| JP | 2007-106022 | 4/2007 |
| JP | 2008-087167 | 4/2008 |
| JP | 2013-75366 | 4/2013 |
| JP | 2013-177714 | 9/2013 |
| JP | 2014-173203 | 9/2014 |
| JP | 2017133114 A * | 8/2017 |
| JP | 2019001129 A * | 1/2019 |
| WO | 2019/181676 | 9/2019 |

OTHER PUBLICATIONS

English translation of JP 2019-1129 to Sakurai et al. obtained from Espacenet database (Year: 2019).*
English translation of JP 2017-133114 to Fujisawa et al. obtained from PE2E database. (Year: 2017).*
Williams, M., "How Milliken Innovation Is Shaping This Year's Gift Exchange," Milliken Innovation Blog, Dec. 6, 2016 (available at https://blog.milliken.com/how-milliken-innovation-is-shaping-this-years-gift-exchange) (Year: 2016).*
James, G., "Through Innovarest brand, supplier goes beyond FR nonwovens with specialty textiles and more," Bed Times Magazine, Nov. 1, 2017 (available at https://bedtimesmagazine.com/2017/11/milliken-deepens-commitment-bedding/) (Year: 2017).*
International Preliminary Report on Patentability Chapter I dated Sep. 29, 2022, in PCT/JP2021/014123, with English translation, 10 pages.
BASF SE, "Paliogen® Black L 0086 Paliogen® Schwarz L 0086", Safety Data Sheet, Feb. 1, 2009, pp. 1-2, with English translation.
European Search Report received for European Patent Application No. 21780123.2, mailed on Mar. 21, 2024, 7 pages.
International Search Report dated Jul. 6, 2021, in PCT/JP2021/014123, with English translation, 5 pages.

* cited by examiner

COLORED RESIN SHEET AND LEATHER-LIKE SHEET

CROSS-REFERENCE TO RELATED APPLICATIONS

This application is the National Stage entry under § 371 of International Application No. PCT/JP2021/014123, filed on Apr. 1, 2021, and which claims the benefit of priority to Japanese Application No. 2020-066451, filed on Apr. 2, 2020. The content of each of these applications is hereby incorporated by reference in its entirety.

TECHNICAL FIELD

The present invention relates to a colored resin sheet and a leather-like sheet that have a light transmitting property.

BACKGROUND ART

With the recent diversification of consumer tastes and preferences, there is a need for a material having a novel design as a material for decorating the surface of articles. Under such a circumstance, there have been proposed techniques by which a lighting device such as a backlight or a liquid crystal panel including a backlight is disposed on a back surface of a colored sheet, then the lighting device is caused to emit light, and the light is transmitted through the sheet, thus causing characters, figures, and the like to emerge on the surface of the sheet.

For example, PTL 1 listed below discloses a synthetic leather including a raw fabric, and a skin layer that is made of a polyurethane resin and is stacked on the raw fabric, wherein the synthetic leather has a visible light transmittance of 0.10 to 11.90% for a wavelength range of 380 to 780 nm. In addition, PTL 1 discloses a black synthetic leather obtained by stacking, on a raw fabric that is a black polyester knitted fabric, a skin layer colored in black using a black pigment (trade name "Dirac L-1770" manufactured by DIC Corporation), wherein the synthetic leather has a visible light transmittance of 0.17 to 0.20% for a wavelength range of 380 to 780 nm. Furthermore, PTL 1 discloses a white synthetic leather obtained by stacking, on a raw fabric that is a white polyester knitted fabric, a skin layer colored in white using a white pigment (trade name "Dirac L-1781" manufactured by DIC Corporation), wherein the synthetic leather has a visible light transmittance of 10.87 to 11.90% for a wavelength range of 380 to 780 nm.

PTL 2 listed below discloses a light-transmissive artificial leather sheet using a transparent or semi-transparent elastomer sheet, wherein a smoke print layer is provided on a back surface or a front surface of the elastomer sheet, a mask print layer for causing a character, a figure, or a pattern, or a design including a combination thereof to emerge is provided on an outermost layer that is the back surface of the elastomer sheet, and irregularities in a leather-like pattern are formed on the front surface of the elastomer sheet.

CITATION LIST

Patent Literatures

[PTL 1] Japanese Laid-Open Patent Publication No, 2013-177714

[PTL 2] Japanese Laid-Open Patent Publication No. 2014-173203

SUMMARY OF INVENTION

Technical Problem

It has been difficult to cause a colored resin sheet colored in a dark color such as black to maintain high light transmission. When the content ratio of the colorant included in the colored resin sheet is reduced in order to increase the light transmission, the degree of darkness is reduced. When the content ratio of the colorant in the colored resin sheet is increased in order to increase the degree of darkness, the light transmission is reduced.

As such, for a colored resin sheet colored in a dark color, an increase in the light transmission is likely to result in a reduction in the degree of darkness of the appearance, and an increase in the degree of darkness of the appearance is likely to result in a reduction in the light transmission. Thus, for a colored resin sheet colored in a dark color, there is a trade-off relationship between the dark color and the light transmission.

In the case of a colored resin sheet having a medium-dark color or a low-dark color, an underlayer covered by the colored resin sheet may not be concealed sufficiently, so that the design quality of the colored resin sheet may be reduced, or characters, figurers, or the like emerging on the surface of the colored resin sheet may be obscure.

It is an object of the present invention to provide a colored resin sheet that is excellent in balance between the colorability and the light transmission. It is another object of the invention to provide a leather-like sheet including a colored layer, wherein the leather-like sheet is excellent in balance between the light transmission that makes the light transmitted therethrough clear, and the concealing effect for a fiber base material.

Solution to Problem

One aspect of the present invention is directed to a colored resin sheet including: a resin; and a colorant dispersed in the resin, wherein the colored resin sheet has an average value of visible light transmittances for a red range of a wavelength of 680 to 780 nm, of 50% or more, and satisfies either: a condition of having a lightness $L^*$ value of 15 or less, and an average value of light transmittances for an entire visible light range of a wavelength of 380 to 780 nm, of 15% or more; a condition of having a lightness $L^*$ value greater than 15 and less than or equal to 35, and an average value of light transmittances for the entire visible light range, of 25% or more; or a condition of having a lightness $L^*$ value greater than 35 and less than or equal to 60, and an average value of light transmittances for the entire visible light range, of 40% or more. Note that the average values of the light transmittances are all arithmetic mean values. For such a colored resin sheet, a large amount of light in a red range of a wavelength of 680 to 780 nm that is unlikely to attenuate the emission color is transmitted such that the average value thereof is 50% or more, whereby a colored resin sheet that is excellent in balance between the colorability and the high light transmission can be obtained.

It is preferable that the colorant has an average dispersed particle size of 400 nm or less, and also that the colorant is miscible with the resin at a molecular level, because a colored resin sheet that can maintain high light transmission even after being colored in a dark color is likely to be obtained.

It is preferable that the lightness $L^*$ value is greater than or equal to 5 and less than or equal to 15, and the average value of light transmittances for the entire visible light range is 15 to 268, because of the excellent balance between the dark color and the light transmission. For a deep-dark color having a lightness L* value of less than 5, the color becomes too dark to achieve a balance between the dark color and the light transmission.

It is preferable that the lightness L* value is greater than 15 and less than or equal to 35, and the average value of light transmittances for the entire visible light range is 25 to 35%, because of the excellent balance between the medium-dark color and the light transmission.

It is preferable that the lightness L* value is greater than 35 and less than or equal to 60, and the average value of light transmittances for the entire visible light range is 40 to 50%, because of the excellent balance between the low-dark color and the light transmission. When the lightness L* value is greater than 60, the color becomes light, resulting in a poor balance between the coloration and the light transmission.

Another aspect of the present invention is directed to a leather-like sheet including a fiber base material, and a colored resin layer stacked on the fiber base material. The colored resin layer includes a resin, and a colorant dispersed in the resin. Also, the leather-like sheet includes, on a surface of the colored resin layer, a surface having a lightness L* value of 60 or less. The leather-like sheet has an average value of visible light transmittances for a red range of a wavelength of 680 to 780 nm, of 5% or more. Preferably, the average value of light transmittances for an entire visible light range of a wavelength of 380 to 780 nm is 2% or more. In such a leather-like sheet, the colored resin layer exhibits an excellent concealing effect for the fiber base material. In addition, such a leather-like sheet can maintain the light transmission that makes the light transmitted therethrough clear even when the leather-like sheet includes a surface having a dark color in the range from a dark color having a lightness L* value of 40 or less to a low-dark color.

It is preferable that the lightness L* value of the surface is in such a range from a dark color having a lightness L* value of 25 or less to a medium-dark color, because the leather-like sheet is likely to maintain the light transmission such that the average value of light transmittances for an entire visible light of a wavelength of 380 to 780 nm is 2% or more. Such a leather-like sheet is likely to be obtained by using, as the colored resin layer, a colored resin sheet having an average value of visible light transmittances for a red range of a wavelength of 680 to 780 nm, of 50% or more.

In particular, it is preferable that the surface of the leather-like sheet has a lightness L* value of 15 or less, preferably 15 or less and 5 or more, and the leather-like sheet has an average value of light transmittances for an entire visible light range of a wavelength of 380 to 780 nm, of 2% or more. Such a leather-like sheet is preferable in that, for a dark color, it is particularly excellent in balance between the light transmission that makes the light transmitted therethrough clear and the concealing effect for the fiber base material.

It is preferable that the surface of the leather-like sheet has a lightness L* value greater than 15 and less than or equal to 25, and the leather-like sheet has an average value of light transmittances for an entire visible light range, of 3% or more. Such a leather-like sheet is preferable in that, for a dark color in the range from a medium-dark color to a low-dark color, it is particularly excellent in balance between the light transmission that makes the light transmitted therethrough clear and the concealing effect for the fiber base material.

It is preferable that the surface of the leather-like sheet has a lightness L* value greater than 25 and less than or equal to 40, and the leather-like sheet has an average value of light transmittances for the entire visible light range, of 4% or more. Such a leather-like sheet is preferable in that, for a low-dark color, it is particularly excellent in balance between light transmission that makes the light transmitted therethrough clear and the concealing effect for the fiber base material.

It is preferable that the fiber base material includes, in voids thereof, an elastic polymer in a proportion of 10 to 50 mass % relative to a total amount of the elastic polymer and the fiber base material, and has a porosity of 70 vol % or less, because of the further excellent light transmission.

It is preferable that the fiber base material is a fiber structure including white fibers, because the leather-like sheet is likely to maintain high light transmission such that the average value of light transmittances for the entire visible light range of a wavelength of 380 to 780 nm is of 2% or more.

Advantageous Effects of Invention

According to the present invention, a colored resin sheet that has been colored can maintain high light transmission. Furthermore, it is possible to obtain a leather-like sheet including a colored layer, wherein the leather-like sheet is excellent in balance between the light transmission that makes the light transmitted therethrough clear and the concealing effect for a fiber base material.

DESCRIPTION OF EMBODIMENT

Hereinafter, an embodiment of a colored resin sheet and a leather-like sheet will be described in detail.

A colored resin sheet of the present embodiment is a colored resin sheet in which a colorant is dispersed in a resin sheet, wherein the colored resin sheet has an average value of visible light transmittances for a red range of a wavelength of 680 to 780 nm, of 50% or more, and satisfies either: a condition of having a lightness L* value of 15 or less, and an average value of light transmittances for an entire visible light range of a wavelength of 380 to 780 nm, of 15% or more; a condition of having a lightness L* value greater than 15 and less than or equal to 35, and an average value of light transmittances for the entire visible light range, of 25% or more; or a condition of having a lightness L* value greater than 35 and less than or equal to 60, and an average value of light transmittances for the entire visible light range, of 40% or more. For such a colored resin sheet, a large amount of light in a red range of a wavelength of 680 to 780 nm that is unlikely to attenuate the emission color is transmitted such that the average value thereof is 50% or more, whereby it is possible to maintain a high average value of light transmittances for the entire visible light range.

As the resin for forming the resin sheet, various transparent resins having a light transmitting property, namely, an average value of light transmittances for an entire visible light range of a wavelength of 380 to 780 nm, of preferably 60% or more, and more preferably 70% or more can be preferably used. Examples of such transparent resins include transparent hard resins including, for example, a polycarbonate-based resin, and transparent elastic polymers including, for example, a polyurethane-based elastic body, an acrylic elastic body, a polyamide-based elastic body, a polyester-based elastic body, a polystyrene-based elastic body, and a polyolefin-based elastic body. Transparent elastic polymers are particularly preferable because a leather-like soft texture can be maintained when the colored resin sheet is used as a colored resin layer serving as a surface layer of a leather-like sheet described below.

Examples of the coloring pigment dispersed in the resin sheet include pigments and dyes that increase the transmission of visible light in the range of 680 to 780 nm. Specific examples of such pigments include reactive special pigments in which polyol is bound to a chromophore, such as Vivitint and Reactint manufactured by Milliken & Company; dispersing-type perylene black; organic pigments such as Pigment Yellow 73 and Pigment Red 5; polymerizable dyes in which a reactive polymerizable group is incorporated; disperse dyes; and basic dyes. Among these, Vivitint and Reactint are particularly preferable.

The colorant has an average dispersed particle size of preferably 400 nm or less, and more preferably 300 nm or less, and it is particularly preferable that the colorant is miscible with the colored resin sheet at a molecular level such that the shapes of the contours of particles cannot be clearly identified. When the average dispersed particle size of the colorant is too large, light with a long wavelength is likely to be scattered or reflected by the particles of the colorant, so that the average value of visible light transmittances for a red range of a wavelength of 680 to 780 nm described below is difficult to be kept at 50% or more.

The colored resin sheet has an average value of visible light transmittances for a red range of a wavelength of 680 to 780 nm, of 50% or more, preferably 55 to 65%. When the colored resin sheet has an average value of visible light transmittances for red range of a wavelength of 680 to 780 nm, of 50% or more, it is possible to increase the average value of light transmittances for the entire visible light range without significantly attenuating the emission color.

Also, the colored resin sheet as described above is colored in a dark color such as black having a lightness L* of 15 or less, a medium-dark color having a lightness L* greater than 15 and less than or equal to 35, or a low-dark color having a lightness L* greater than 35 and less than or equal to 60, which have light transmittances described below.

In the case of a dark color having a lightness L* value of 15 or less, preferably a dark color having a lightness L* value greater than 5 and less than or equal to 15, the average value of light transmittances for the entire visible light range of a wavelength of 380 to 780 nm is 15% or more, preferably 15 to 26%. For example, a colored resin sheet, shown in FIG. 2, that was obtained in Example 5 described below and in which 15 mass % of VIVITINT BLACK856 was blended is a colored resin sheet in a black dark color having a lightness L* value of 5.7 and an average value of light transmittances for a visible light range of a wavelength of 380 to 780 nm, of 16.6%. On the other hand, a colored resin sheet, shown in FIG. 2, that was obtained in Comparative Example 6 described below and in which 3.0 mass % of carbon black was blended is a colored resin sheet in a deep-dark color having a lightness L* value of 4.2 and an average value of light transmittances for a visible light range of a wavelength of 380 to 780 nm, of 1.1%.

In the case of a medium-dark color having a lightness L* value greater than 15 and less than or equal to 35, the average value of light transmittances for the entire visible light range of a wavelength of 380 to 780 nm is 25% or more, preferably 25 to 358, and more preferably 30 to 35%. For example, a colored resin sheet that was obtained in Example 2 described below and in which 5 mass % of VIVITINT BLACK856 was blended is a colored resin sheet in a medium-dark color having a lightness L* value of 28.1 and an average value of light transmittances for a visible light range of a wavelength of 380 to 780 nm, of 32.7%. For example, a colored resin sheet that was obtained in Example 6 described below and in which 5 mass % of dispersing-type perylene black was blended is a colored resin sheet in a medium-dark color having a lightness L* value of 23.7 and an average value of light transmittances for a visible light range of a wavelength of 380 to 780 nm, of 25.2%.

Additionally, in the case of a low-dark color having a lightness L* value greater than 35 and less than or equal to 60, the average value of light transmittances for the entire visible light range of a wavelength of 380 to 780 nm is 40% or more, preferably 40 to 50%, and more preferably 45 to 508. For example, a colored resin sheet that was obtained in Example 1 described below and in which 2.5 mass % of VIVITINT BLACK856 was blended is a colored resin sheet in a low-dark color having a lightness L* value of 52.3 and an average value of light transmittances for a visible light range of a wavelength of 380 to 780 nm, of 45.8%.

The thickness of the colored resin sheet and the content ratio of the colorant can be adjusted such that the average value of light transmittances for the entire visible light range of a wavelength of 380 to 780 nm is within a predetermined range, according to the lightness of the surface of the intended colored resin sheet. Examples of the thickness of the colored resin sheet and the content ratio of the colorant include a combination of a thickness of the colored resin sheet of 30 to 90 µm and a content ratio of the colorant of 1 to 20 mass %.

The colored resin sheet may have a monolayer structure formed of a resin composition having a uniform formulation, or may have a stacked structure formed of resin compositions having formulations different from each other.

The leather-like sheet of the present embodiment is a leather-like sheet including a fiber base material, and a colored resin layer stacked on the fiber base material. The colored resin layer includes a colored resin layer in which a colorant is dispersed in a resin. The lightness L* value of the surface of the leather-like sheet is 40 or less. The leather-like sheet has an average value of visible light transmittances for a red range of a wavelength of 680 to 780 nm, of 5% or more.

Examples of the fiber base material include a non-woven fabric, a woven fabric, a knitted fabric, and a combination thereof. Among these, a non-woven fabric, in particular, a non-woven fabric of ultrafine fibers having a fineness of 1 dtex or less is preferable in that a flexible leather-like sheet can be obtained. In the present embodiment, a case where the fiber base material is a non-woven fabric will be described in detail as a representative example.

As the resin for forming the fibers that form the fiber base material, a thermoplastic resin having a light transmitting property is preferably used. Specific examples of such a thermoplastic resin include thermoplastic resins having fiber-forming properties, including, for example, polyester resins such as polyethylene terephthalate (PET) or modified polyester resins, such as a modified PET, obtained by copolymerization thereof with a trace amount of a monomer unit; polyamide resins such as polyamide 66; various acrylic resins; and olefin resins such as polyethylene and polypropylene. These may be used alone or in a combination of two or more.

The fiber form such as the fineness, the cross-sectional shape, and the fiber length of the fibers that form the fiber base material can be selected as appropriate. As for the fineness of the fibers, fibers having an ordinary fineness and ultrafine fibers having a fineness of 1 dtex or less may be used. Among these, a non-woven fabric of ultrafine fibers having a fineness of 0.8 dtex or less is preferable because the non-woven fabric is excellent in suppleness and can be densified to have a reduced porosity, thus improving the light transmission. Note that the fineness is calculated by taking a scanning electron microscope (SEM) photograph of a cross section of the leather-like sheet at a magnification of 3000×, measuring the cross-sectional areas of 10 randomly selected fiber cross sections, calculating an average value of the cross-sectional areas, and converting the value into a fineness based on the densities of the resins.

If necessary, various additives, specifically, for example, a stain inhibitor, a heat-resistant agent, a flame retardant, a lubricant, an antifouling agent, a fluorescent brightener, a matting agent, a gloss improver, an antistatic agent, a fragrance, a deodorant, a catalyst, an antimicrobial, a tick repellent, and inorganic fine particles may be blended in the resin used for production of the fiber base material as long as the objects and effects of the present invention are not impaired. Note that the resin used for production of the non-woven fabric is preferably in the form of colorless fibers or white fibers containing substantially no colorant that colors the fibers, because a leather-like sheet having high light transmission is likely to be obtained. Note that white fibers means original fibers in which a colorant such as a coloring pigment or a dye is not mixed with a raw material before spinning.

It is preferable that the fiber base material contains, in internal voids thereof, an elastic polymer, preferably a light-transmissive, uncolored elastic polymer. Specific examples of such an elastic polymer include a polyurethane-based elastic body, an acrylic elastic body, a polyamide-based elastic body, a polyester-based elastic body, a polystyrene-based elastic body, and a polyolefin-based elastic body. Among these, a polyurethane-based elastic body and an acrylic elastic body, in particular, a combination of a polyurethane-based elastic body and an acrylic elastic body is preferable because of the excellent balance between the light transmission and the mechanical properties. It is preferable that the elastic polymer is a non-foam in order to maintain high light transmission.

When the fiber base material is an entangled non-woven fabric of ultrafine fibers made of an island component obtained by removing a sea component from an entangled sheet of island-in-the-sea conjugated fibers, it is preferable to apply the elastic polymer also into voids in a fiber bundle formed by removing the sea component, because the refractive index difference is reduced by replacing an interface between the ultrafine fibers and the air with an interface between the ultrafine fibers and the elastic polymer, thus making it possible to further improve the light transmission.

When the fiber base material includes an elastic polymer, the content ratio of the elastic polymer in the fiber base material is preferably 1 to 50 masse, and more preferably 5 to 30 mass %.

When the fiber base material includes the elastic polymer, the porosity in the fiber base material is 70 vol % or less, even 60 vol % or less, particularly 50 vol % or less, preferably 30 vol % or more, because high translucency is provided.

The thickness of the fiber base material is preferably 0.1 to 1.0 mm, and more preferably 0.2 to 0.6 mm, because a leather-like sheet that maintains high light transmission is likely to be obtained.

Figure 1:
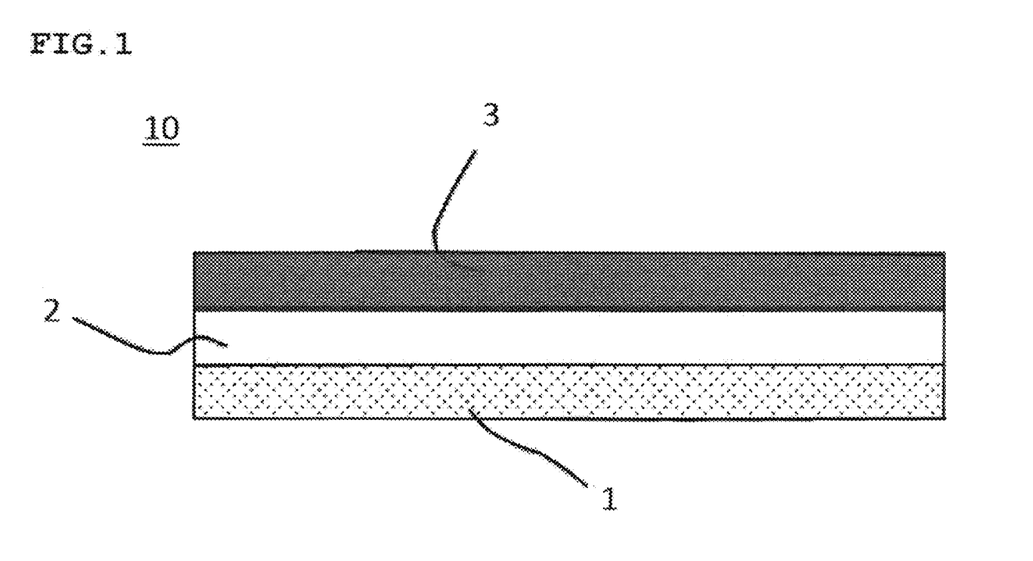
FIG. 1 is a schematic cross-sectional view of a leather-like sheet 10 according to an embodiment.

Referring to FIG. 1, an intermediate layer 2 is attached to one surface of a fiber base material 1 that forms a leather-like sheet 10, and the colored resin sheet is attached to the intermediate layer 2 as a colored resin layer 3.

The leather-like sheet 10 is formed by forming a colored resin sheet on a support base material such as release paper, subsequently forming an adhesive intermediate layer on the surface of the colored resin sheet, then attaching, if necessary, bonding through pressing the intermediate layer to one surface of the fiber base material 1, and releasing the release paper.

The thickness of the intermediate layer is not particularly limited, but is preferably 10 to 300 μm, for example.

The intermediate layer is a monolayer or multilayered elastic layer formed for ensuring a sufficient thickness for imparting elasticity to the leather-like sheet, or bonding the colored resin sheet to the fiber base material. Examples of the elastic polymer for forming the intermediate layer include a polyurethane-based elastic body, an acrylic elastic body, a polyamide-based elastic body, a polyester-based elastic body, a polystyrene-based elastic body, and a polyolefin-based elastic body, all of which have been conventionally used for production of a resin layer that forms the surface of a leather-like sheet.

The thickness of the thus obtained leather-like sheet of the present embodiment is not particularly limited, but is, for example, preferably 0.02 to 10 mm, and more preferably about 0.05 to 5 mm, because light transmission can be sufficiently maintained.

The apparent density of the leather-like sheet is preferably 0.03 to 1.5 g/cm$^3$, and more preferably 0.06 to 1.2 g/cm$^3$. In this manner, it is preferable that the leather-like sheet is dense, because the reinforcing effect is further increased.

A leather-like sheet of the present embodiment includes a colored resin layer, and the colored resin layer includes, for example, a colored resin sheet as described above. Also, the leather-like sheet includes a surface having a lightness L* value of 40 or less, and has an average value of visible light transmittances for a red range of a wavelength of 680 to 780 nm, of 5% or more.

The leather-like sheet of the present embodiment has an average value of light transmittances for the entire visible light range of a wavelength of 380 to 780 nm, of preferably 2% or more, more preferably 2 to 208, and particularly preferably 2 to 10%. When the average value of light transmittances for a visible light range of an wavelength of 380 to 780 nm is less than 2%, characters or figures tend to be difficult to be clearly displayed with light on the surface of the colored resin layer due to low light transmission. When the average value of light transmittances for a visible light range of a wavelength of 380 to 780 nm is too high, it becomes difficult to obtain a leather-like sheet whose surface has a lightness L* value of 40 or less.

The lightness L* value based on the L*a*b* color system of the surface of the leather-like sheet is 40 or less, preferably 25 or less.

The leather-like sheet of the present embodiment has an average value of light transmittances for a red range of a wavelength of 680 to 780 nm, of 5% or more, preferably 7 to 15%. When the leather-like sheet has an average value of light transmittances for a red range of a wavelength of 680 to 780 nm, of 5% or more, the leather-like sheet transmits therethrough a large amount of light in a red range that is less likely to attenuate the emission color, and is likely to maintain light transmission such that the average value of light transmittances for a visible light range of a wavelength of 380 to 780 nm is, for example, 2% or more even if the lightness L* value of the surface is 15 or less.

With the leather-like sheet of the present embodiment, it is possible to obtain a leather-like sheet that is excellent in colorability and light transmission, such as a leather-like sheet having an average value of light transmittances for the entire visible light range of a wavelength of 380 to 780 nm, of 2% or more when the lightness L* value is 15 or less, preferably when the lightness L* value is greater than 5 and less than or equal to 15, a leather-like sheet having an average value of light transmittances for the entire visible light range, of 3% or more when the lightness L* value is greater than 15 and less than or equal to 25, or a leather-like sheet having an average value of light transmittances for the entire visible light range, of 4% or more when the lightness L* value is greater than 25 and less than or equal to 40.

The leather-like sheet described thus far can be preferably used, for example, as a skin material of a light-emitting construction in which a light-emitting device such as a backlight or a liquid crystal panel including a backlight is disposed on the back surface thereof, then the lighting device is caused to emit light, and the light is transmitted through the leather-like sheet, thus causing characters, figures, and the like to emerge on the surface of the leather-like sheet.

EXAMPLES

Hereinafter, the present invention will be described in further detail by way of examples. It should be appreciated that the scope of the invention is by no means limited to the examples.

First, the evaluation methods used in the present examples will be collectively described below.
(Lightness L* Value)

The chromaticity of a surface of each colored resin sheet or a surface of a colored resin layer of each leather-like sheet was measured using a spectrocolorimeter (CM-3610d, a D65 light source manufactured by KONICA MINOLTA, INC). Specifically, a standard whiteboard (an aluminum oxide board) was disposed on a surface opposite to the aforementioned surface of the colored resin sheet or the leather-like sheet, which was then set in the spectrocolorimeter for measurement. The lightness L* value based on the L*a*b* color system was determined from the measured value.
(Measurement of Light Transmittances of Colored Resin Sheet)

Figure 2:
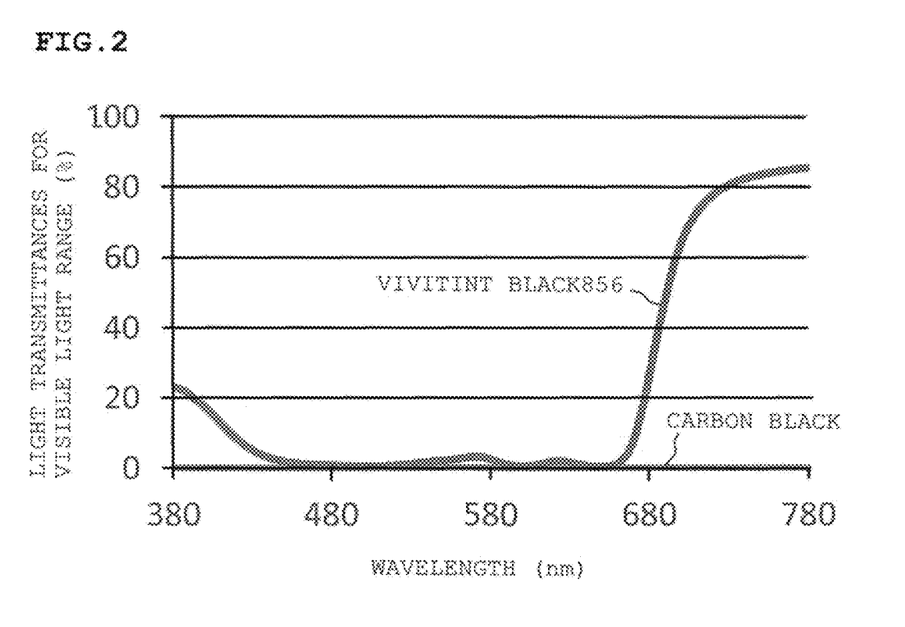
FIG. 2 shows spectra indicating light transmittances for a visible light range of a wavelength of 380 to 780 nm of colored resin sheets (colored resin layers) obtained in Example 5 and Comparative Example 6.

A 60 μm thick film of each colored resin sheet was formed on release paper. Then, the obtained colored resin sheet was released from the release paper. Then, the light transmittances for a wavelength range of 380 to 780 nm of the film of the colored resin sheet were measured using a spectrophotometer (U-3010 Spectrophotometer manufactured by HITACHI). Then, the arithmetic mean value of light transmittances for the entire visible light range of a wavelength range of 380 to 780 nm, and the arithmetic mean value of light transmittances for a red range of 680 to 780 nm were determined. As examples, FIG. 2 shows spectra indicating light transmittances for a visible light range of a wavelength of 380 to 780 nm of the colored sheets obtained in Example 5 and Comparative Example 6.
(Measurement of Light Transmittances of Leather-Like Sheet)

The light transmittances for a wavelength range of 380 to 780 nm of each leather-like sheet were measured using a spectrophotometer (U-3010 Spectrophotometer manufactured by HITACHI). Then, the arithmetic mean value of light transmittances for the entire visible light range of a wavelength range of 380 to 780 nm, and the arithmetic mean value of light transmittances for a red range of 680 to 780 nm were determined.
(Average Dispersed Particle Size and Dispersibility of Colorant)

A cross section of the colored resin sheet in the thickness direction was measured using a scanning electron microscope (SEM) at a magnification of 3000×, and the average particle size of the colorant particles located in a visual field of a 10 μm square were identified, Note that the average particle size was determined with the distance of the longest portion of each particle defined as a particle size. Then, an arithmetic mean of the particle sizes of the identified particles was calculated as an average dispersed particle size. Also, a colorant was evaluated as "A" when the colorant was dissolved and the contour thereof was not identifiable, "B" when the average particle size was 0.4 μm or less, and "C" when any particle having an average particle size of 0.4 μm or more was present.
(Apparent Density of Leather-Like Sheet)

The thickness (mm) and the basis weight (g/cm²) were measured in accordance with JIS L 1913, and the apparent density (g/cm³) was calculated from the measured values.
(Fineness of Fibers that Form Fiber Base Material of Leather-Like Sheet)

The fineness was calculated by taking a scanning electron microscope (SEM) photograph of a cross section of the leather-like sheet in the thickness direction at a magnification of 3000×, measuring the cross-sectional areas of 10 randomly selected fiber cross sections, calculating an average value of the cross-sectional areas, and converting the value into a fineness based on the density of each resin.
(Porosity of Fiber Base Material of Leather-Like Sheet)

A scanning electron microscope (SEM) photograph of a cross section of each leather-like sheet in the thickness direction was taken at 300X, then a true thickness in the thickness direction was measured, and the porosity of the fiber base material was calculated from the basis weight of the fiber base material and the density of the raw material used for the base material, by the following expression.

Porosity of fiber base material (vol %)=(1−(Basis weight/Raw material density)/(Thickness/True thickness))×100

(Concealing Effect for Fiber Base Material)

Each colored resin sheet was placed on top of a white or black fiber base material, and the degree of see-through visibility as viewed from directly above was visually evaluated. A colored resin sheet was evaluated as "A" when the fiber base material was completely invisible, "B" when the fiber base material was slightly visible, and "C" when the fiber base material was clearly visible.
(Clarity of Transmitted Light)

The clarity of the color of transmitted light that was transmitted through each leather-like sheet was visually evaluated when the leather-like sheet was irradiated with white LED light (150 lumen) from a side thereof on which the colored resin layer was not formed. Transmitted light was evaluated as "A" when the color was light white without becoming yellowish, "B" when the color was slightly yellowish white, and "C" when the color was strongly yellowish, lightened dim white.

Example 1

A resin solution for forming a colored resin sheet was prepared by dispersing a black pigment (VIVITINT BLACK856, manufactured by Milliken & Company) in a 30 mass % polyurethane DMF solution containing a non-yellowing polycarbonate-based polyurethane. Note that 2.5 mass % of the black pigment relative to the solid content of the non-yellowing polycarbonate-based polyurethane was blended in the resin solution. Then, the prepared resin solution was applied onto release paper, and subsequently dried for 2 minutes at 120° C., thus forming a black colored resin sheet having a thickness of 60 μm. Then, the obtained colored resin sheet was released from the release sheet. Then, the properties were evaluated by the above-described methods. The results are shown in Table 1 below.

in a 30 mass % polyurethane DMF solution containing a non-yellowing polycarbonate-based polyurethane. Note that 0.5 mass % of the carbon black relative to the solid content of the non-yellowing polycarbonate-based polyurethane was blended in the resin solution. Thereafter, a colored resin sheet having a thickness of 60 μm was produced and evaluated in the same manner as in Example 1. The results are shown in Table 1.

Comparative Examples 2 to 6

Colored resin sheets were produced and evaluated in the same manner as in Comparative Example 1 except that the mixing ratio of the colorant in each of the colored resin sheets was changed as shown in Table 1. The results are shown in Table 1.

Referring to Table 1, the colored resin sheet obtained in Example 1, which had an average value of visible light transmittances for the red range, of 69.4%, had a low-dark color having an $L^*$ value of 52.3, and the colored resin sheet obtained in Comparative Example 1, which had an average

TABLE 1

| Example No. | Colorant | | | | | Film thickness (μm) | Average total transmittance for entire visible light (%) (380-780 nm) | Average transmittance for red range (%) (680-780 nm) | $L^*$ value |
| --- | --- | --- | --- | --- | --- | --- | --- | --- | --- |
| | Vivitint BL 856 | Perylene black dispersing-type | CB | Average dispersed particle size (nm) | Dispersibility | | | | |
| Ex. 1 | 2.5 | — | — | Invisible | A | 60 | 45.8 | 69.4 | 52.3 |
| Ex. 2 | 5 | — | — | Invisible | A | 60 | 32.7 | 66.7 | 28.1 |
| Ex. 3 | 7.5 | — | — | Invisible | A | 60 | 25.2 | 64.1 | 14.3 |
| Ex. 4 | 10 | — | — | Invisible | A | 60 | 20.5 | 60.8 | 7.9 |
| Ex. 5 | 15 | — | — | Invisible | A | 60 | 16.6 | 56.5 | 5.7 |
| Ex. 6 | — | 5 | — | 273 | B | 60 | 25.2 | 59.0 | 23.7 |
| Com. Ex. 1 | — | — | 0.5 | 422 | C | 60 | 39.5 | 43.6 | 57.7 |
| Com. Ex. 2 | — | — | 0.75 | 411 | C | 60 | 30.9 | 35.8 | 45.6 |
| Com. Ex. 3 | — | — | 1.0 | 451 | C | 60 | 28.0 | 31.6 | 41.4 |
| Com. Ex. 4 | — | — | 1.25 | 438 | C | 60 | 17.3 | 21.5 | 26.8 |
| Com. Ex. 5 | — | — | 1.5 | 476 | C | 60 | 14.0 | 17.6 | 22.0 |
| Com. Ex. 6 | — | — | 3 | 501 | C | 60 | 1.1 | 3.0 | 4.2 |

Examples 2 to 5

Colored resin sheets were produced and evaluated in the same manner as in Example 1 except that the mixing ratio of the colorant in each of the colored resin sheets was changed as shown in Table 1. The results are shown in Table 1.

Example 6

A colored resin sheet was produced and evaluated in the same manner as in Example 2 except that VIVITINT BLACK856 was changed to a dispersing-type perylene black. The results are shown in Table 1.

Comparative Example 1

A resin solution for forming a colored resin sheet was prepared in which a black pigment (carbon black, Dirac L-1770, manufactured by DIC Corporation) was dispersed value of visible light transmittances for the red range, of 43.6%, also had a low-dark color having an $L^*$ value of 57.7. The colored resin sheet obtained in Example 1 had an $L^*$ value lower than that of the colored resin sheet obtained in Comparative Example 1, and had a high average value of light transmittances for the entire visible light range despite having a deeper dark color. The colored resin sheets obtained in Examples 2 and 6, which had medium-dark colors having $L^*$ values of 28.1 and 23.7, respectively, also had average values of light transmittances for the entire visible light range that were higher than or comparable to those of the colored resin sheets obtained in Comparative Examples 2 and 3, which had medium-dark colors having $L^*$ values of 45.6 and 41.4, respectively, despite having deeper dark colors. The colored resin sheets obtained in Examples 4 and 5, which had deep dark colors having $L^*$ values of 7.9 and 5.7, respectively, also had average values for light transmittances for the entire visible light range that were higher than or comparable to those of the colored resin sheets obtained in Comparative Examples 4 and 5, which had medium-dark colors having L* values of 26.8 and 22.0, respectively, despite having deeper dark colors.

The colored resin sheet obtained in Example 6, which had a medium-dark color that had an L* value of 23.7 and in which a dispersing-type perylene black was used, also had an average value of light transmittances for the entire visible light range that was higher than that of the colored resin sheet obtained in Comparative Example 5, which had a medium-dark color having an L* value of 22.0.

In addition, each of the colored resin sheets obtained in Examples 1 to 5 did not show coagulation of the colorant, and the colorant was miscible at a molecular level.

Example 7

A water-soluble thermoplastic polyvinyl alcohol resin was used as a sea component, and an isophthalic acid-modified PET having a degree of modification of 6 mol % was used as an island component. Using a multicomponent fiber melt-spinning spinneret, filaments of island-in-the-sea conjugated fibers were ejected from the spinneret at 260° C. such that the number of islands per one fiber was 25, and the sea component/island component ratio was 25/75 (mass ratio). Then, the ejector pressure was adjusted such that the spinning rate was 3700 m/min, and island-in-the-sea conjugated filaments having an average fineness of 2.1 dtex were collected on a net. Then, the island-in-the-sea conjugated filaments collected on the net were lightly pressed with a metal roll having a surface temperature of 42° C. to suppress fuzzing on the surface, then separated from the net, and further subjected to hot pressing by being passed between a grid-patterned metal roll having a surface temperature of 75° C. and a back roll, thus obtaining a filament web having a basis weight of 31 g/m² and in which ultrafine fibers on the surface were temporarily fused.

Then, the obtained filament web was laid in eight layers through cross lapping, and an oil solution for preventing the needles from breaking was sprayed thereto. Then, the web was needle punched at a punching density of 3300 punch/cm² alternately from both sides at a punching depth of 8.3 mm using 6-barb needles with a distance of 3.2 mm from the needle tip to the barb, thus obtaining an entangled filament web having a basis weight of 320 g/m².

Then, the filament web was heat-shrunk by being immersed in hot water for 14 seconds at 70° C. at a take-up line speed of 10 m/min, thus obtaining a densified entangled web.

Next, polyurethane was impregnated into the densified entangled web in the following manner. A polyurethane emulsion (solid content concentration: 30%) composed mainly of polycarbonate/ether polyurethane was impregnated into the densified entangled web. Then, the entangled web was dried in a drying furnace at 150° C. Then, the thus obtained polyurethane-impregnated entangled web was repeatedly subjected to dip-nipping in hot water at 95° C., to remove the modified PVA by dissolution, thus obtaining a non-woven fabric of ultrafine fibers in which fiber bundles each including 25 ultrafine filaments having an average fineness of 0.1 dtex were three-dimensionally entangled. Then, the non-woven fabric was sliced and buffed, thereby being conditioned into a non-woven fabric substrate of ultrafine fibers having an apparent density of 0.50 g/cm³ and a thickness of 0.35 mm Then, the non-woven fabric substrate was impregnated with an acrylic elastic body emulsion (RYUDYE-W BINDER 11KS-EN, resin content: 30 mass %, manufactured by DIC Corporation) at a pick-up rate of 100%. Then, the substrate was dried for 10 minutes using a dryer at 100° C., thus obtaining a fiber base material. The effective component ratio of each of the components in the fiber base material that was calculated from the pick-up rate was such that Ultrafine fibers/Polyurethane/Acrylic elastic body=90/10/20 (mass ratio). The porosity of the fiber base material was 44%.

Then, a colored resin layer was formed and stacked on the fiber base material using dry forming as described below.

In the same manner as in Example 1, a resin solution for forming a colored resin layer was prepared in which a black pigment (VIVITINT BLACK856, manufactured by Milliken & Company) was dispersed in a 30 mass % polyurethane DMF solution containing a non-yellowing polycarbonate-based polyurethane. Then, the prepared resin solution was applied onto release paper, and subsequently dried for 2 minutes at 120° C., thus forming a colored resin sheet having a thickness of 60 μm.

Next, a resin solution for forming an adhesion layer was applied to a surface of the colored resin sheet formed on the release paper, and subsequently dried for 2 minutes at 120° C., thus forming an adhesion layer having a thickness of 50 μm. Note that the resin solution for forming the adhesion layer was a 30 mass % DMF solution of a polycarbonate-based polyurethane.

The thus formed adhesion layer on the release paper was placed in contact with one surface of the fiber base material, and pressure-bonded thereto using a heated roll whose surface temperature was set at 75° C. Then, the whole was aged for 3 days at 50° C., and subsequently the release paper was released, whereby a leather-like sheet including a black colored resin layer was obtained. The thus obtained leather-like sheet had a thickness of 0.31 mm, an apparent density of 1.07 g/cm³, and a basis weight of 333 g/m². Then, the properties were evaluated by the above-described methods. The results are shown in Table 2.

TABLE 2

| | Colorant | | | | Colored resin sheet | | | |
| --- | --- | --- | --- | --- | --- | --- | --- | --- |
| | | | | | | Average transmittance for entire visible light (%) (380-780 nm) | Average transmittance for red range (%) (680-780 nm) | |
| Example No. | Vivitint BL 856 | CB | Average dispersed particle size (nm) | Dispersibility | Film thickness (μm) | | | L* value |
| Ex. 7 | 2.5 | — | Invisible | A | 60 | 45.8 | 69.4 | 52.3 |
| Ex. 8 | 5 | — | Invisible | A | 60 | 32.7 | 66.7 | 28.1 |
| Ex. 9 | 7.5 | — | Invisible | A | 60 | 25.2 | 64.1 | 14.3 |
| Ex. 10 | 1.0 | — | Invisible | A | 60 | 20.5 | 60.8 | 7.9 |

TABLE 2-continued

| | | | | | | | | |
|---|---|---|---|---|---|---|---|---|
| Ex. 11 | 15 | — | Invisible | A | 60 | 16.6 | 56.5 | 5.74 |
| Ex. 12 | 5 | — | Invisible | A | 50 | 32.7 | 66.7 | 28.1 |
| Ex. 13 | 10 | — | Invisible | A | 60 | 20.5 | 60.8 | 7.9 |
| Ex. 14 | 15 | — | Invisible | A | 50 | 16.6 | 56.5 | 5.74 |
| Com. Ex. 7 | — | 0.5 | 422 | C | 60 | 39.5 | 43.6 | 57.7 |
| Com. Ex. 8 | — | 0.75 | 411 | C | 60 | 30.9 | 35.8 | 45.6 |
| Com. Ex. 9 | — | 1.0 | 451 | C | 60 | 28.0 | 31.6 | 41.4 |
| Com. Ex. 10 | — | 1.25 | 438 | C | 60 | 17.3 | 21.5 | 26.8 |
| Com. Ex. 11 | — | 1.5 | 476 | C | 60 | 14.0 | 17.6 | 22.0 |
| Com. Ex. 12 | — | 0.5 | 422 | C | 60 | 39.5 | 43.6 | 57.7 |
| Com. Ex. 13 | — | 1.0 | 451 | C | 60 | 28.0 | 31.6 | 41.4 |
| Cont. Ex. 14 | — | 2.0 | 501 | C | 60 | 4.8 | 5.2 | 10.0 |
| Com. Ex. 15 | — | 1.0 | 451 | C | 60 | 28.0 | 31.6 | 41.4 |
| Com. Ex. 16 | 10 | — | Invisible | A | 60 | 20.5 | 60.8 | 7.9 |

| Example No. | Fiber base material | | | | Leather-like sheet | | | Effects of Invention | |
| | Fibers | Form | Color | Porosity (%) | Average transmittance for entire visible light (%) (380-780 nm) | Average transmittance for red range (%) (680-780 nm) | L* value | Concealing effect | Clarity |
|---|---|---|---|---|---|---|---|---|---|
| Ex. 7 | PET | Non-woven fabric | White | 44 | 4.9 | 10.9 | 39.0 | B | A |
| Ex. 8 | | | | 44 | 4.7 | 9.9 | 20.4 | A | A |
| Ex. 9 | | | | 44 | 3.8 | 9.3 | 10.9 | A | B |
| Ex. 10 | | | | 44 | 2.6 | 9.0 | 7.7 | A | B |
| Ex. 11 | | | | 44 | 2.2 | 8.2 | 6.9 | A | B |
| Ex. 12 | | Knitted fabric | | 65 | 4.8 | 9.3 | 22.2 | B | A |
| Ex. 13 | | | | 65 | 3.0 | 9.1 | 8.1 | A | B |
| Ex. 14 | | | | 65 | 2.5 | 8.6 | 7.0 | A | B |
| Com. Ex. 7 | PET | Non-woven fabric | White | 44 | 3.7 | 4.5 | 44.4 | C | A |
| Com. Ex. 8 | | | | 44 | 2.4 | 3.1 | 34.8 | B | C |
| Com. Ex. 9 | | | | 44 | 2.2 | 2.7 | 31.3 | B | C |
| Com. Ex. 10 | | | | 44 | 1.5 | 2.0 | 20.8 | A | C |
| Com. Ex. 11 | | | | 44 | 1.0 | 1.4 | 17.2 | A | C |
| Com. Ex. 12 | | Knitted fabric | | 65 | 0.7 | 1.5 | 58.0 | C | A |
| Com. Ex. 13 | | | | 65 | 0.5 | 1.0 | 42.0 | C | C |
| Com. Ex. 14 | | | | 65 | 0.3 | 0.6 | 26.7 | B | C |
| Com. Ex. 15 | | Non-woven fabric | Black | 44 | 0.0 | 0.0 | 28.5 | B | C |
| Com. Ex. 16 | | Non-woven fabric | White | 72 | 1.9 | 4.8 | 8.0 | A | C |

Examples 8 to 11

Leather-like sheets were produced and evaluated in the same manner as in Example 1 except that the mixing ratio of the colorant in each of the colored resin sheets was changed as shown in Table 2 as in the case of the Examples 2 to 5, The results are shown in Table 2 below.

Examples 12 to 14

Leather-like sheets were produced and evaluated in the same manner as in Example 8, 10, or 14 except that the fiber base material was changed from the PET non-woven fabric to a PET knitted fabric. The results are shown in Table 2.

Comparative Examples 7 to 11

Leather-like sheets were produced and evaluated in the same manner as in Example 7 except that the mixing ratio of the colorant in each of the colored resin layers was changed as shown in Table 2. The results are shown in Table 2.

Comparative Examples 12 to 14

Leather-like sheets were produced and evaluated in the same manner as in Comparative Example 6, 8, or the like except that the fiber base material was changed from the PET non-woven fabric to a PET knitted fabric. The results are shown in Table 2.

Comparative Example 15

In the production of the filament web in Example 7, the fibers were colored in black by blending 0.5 mass % of carbon black in the isophthalic acid-modified PET having a degree of modification of 6 mol %, thus producing a fiber base material. With the other conditions being the same as those in Comparative Example 9, a leather-like sheet was produced and evaluated. The results are shown in Table 2.

Comparative Example 16

A colored resin sheet was produced and evaluated in the same manner as in Example 10 except that the porosity of the fiber base material was changed to 72 vol %. The results are shown in Table 2.

Referring to Table 2, each of the leather-like sheets obtained in Examples 7 to 14, which included a colored resin layer in which the colorant was dispersed and that had an average value of visible light transmittances for the red range, of 50% or more, and whose surface had a lightness L* value of 60 or less, had an average value of light transmittances for the entire visible light range of a wavelength of 380 to 780 nm, of 2% or more, thus exhibiting a high transmittance for the entire visible light. For example, the leather-like sheet obtained in the Example 8, which had an L* value of 20.4, had a transmittance for the entire visible light, of 4.7, whereas the leather-like sheet obtained in Comparative Example 10, which had a comparable L* value, namely 20.8, had a transmittance for the entire visible light, of 2.0. It can be seen that similar results were obtained from comparisons between the other example and comparative examples.

REFERENCE SIGNS LIST

1 . . . Fiber base material
2 . . . Adhesion layer
3 . . . Colored resin layer
10 . . . Leather-like sheet

The invention claimed is:

1. A leather-like sheet, comprising:
    a fiber base material; and
    a colored resin layer stacked on the fiber base material,
    wherein the colored resin layer includes a resin and a colorant dispersed in the resin;
    the colorant includes a reactive special pigment in which polvol is bound to a chromophore;
    a thickness of said colored resin layer is from 30 to 90 μm;
    a content ratio of said colorant in said colored resin layer is 1 to 13 mass %;
    the leather-like sheet has a surface having a lightness L* value of 40 or less;
    the leather-like sheet has an average value of visible light transmittances of 5% or more for a red range of a wavelength of 680 to 780 nm; and
    the leather-like sheet is an artificial leather or a synthetic leather.

2. The leather-like sheet according to claim 1, wherein the leather-like sheet has an average value of light transmittances of 2% or more for an entire visible light range of a wavelength of 380 to 780 nm.

3. The leather-like sheet according to claim 2, wherein the leather-like sheet has the surface having the lightness L* value greater than or equal to 5 and less than or equal to 15.

4. The leather-like sheet according to claim 1, wherein the leather-like sheet has the surface having the lightness L* value greater than 15 and less than or equal to 25, and has an average value of light transmittances of 3% or more for an entire visible light range of a wavelength of 380 to 780 nm.

5. The leather-like sheet according to claim 1, wherein the leather-like sheet has the surface having the lightness L* value greater than 25 and less than or equal to 40, and has an average value of light transmittances of 4% or more for an entire visible light range of a wavelength of 380 to 780 nm.

6. The leather-like sheet according to claim 1, wherein the colored resin layer comprises a colored resin sheet having an average value of visible light transmittances of 50% or more for a red range of a wavelength of 680 to 780 nm.

7. The leather-like sheet according to claim 1, wherein the colorant has an average dispersed particle size of 400 nm or less.

8. The leather-like sheet according to claim 1, wherein the fiber base material includes, in voids thereof, an elastic polymer in a proportion of 10 to 50 mass % relative to a total amount of the elastic polymer and the fiber base material, and has a porosity of 70 vol % or less.

9. The leather-like sheet according to claim 1, wherein the fiber base material is a fiber structure comprising white fibers.

\* \* \* \* \*